United States Patent
Dubs et al.

(10) Patent No.: US 9,292,198 B2
(45) Date of Patent: Mar. 22, 2016

(54) ROTATIONAL GRAPHICAL USER INTERFACE NAVIGATION

(75) Inventors: Justin Tyler Dubs, Durham, NC (US);
Eric Edward Dudkowski, Raleigh, NC (US); Karen Ruth Kluttz, Raleigh, NC (US); Aaron Michael Stewart, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 505 days.

(21) Appl. No.: 13/536,665

(22) Filed: Jun. 28, 2012

(65) Prior Publication Data
US 2012/0272191 A1    Oct. 25, 2012

Related U.S. Application Data

(63) Continuation of application No. 12/054,293, filed on Mar. 24, 2008, now Pat. No. 8,286,099.

(51) Int. Cl.
| | |
|---|---|
| *G06F 3/00* | (2006.01) |
| *G06F 9/00* | (2006.01) |
| *G06F 17/00* | (2006.01) |
| *G06F 3/0488* | (2013.01) |
| *G06F 3/0482* | (2013.01) |

(52) U.S. Cl.
CPC .......... *G06F 3/04883* (2013.01); *G06F 3/0482* (2013.01)

(58) Field of Classification Search
CPC ....... G06F 9/4443; G06F 8/34; G06F 3/0486; G06F 8/38; G06F 3/0481; G06F 3/0482; G06F 3/04812; G06F 3/04847; G06F 3/04883; H04N 1/00389; H04N 1/00411
USPC ......... 715/762, 763, 764, 765, 757, 784, 744, 715/758, 759, 864, 865, 773, 782, 850
See application file for complete search history.

(56) References Cited

U.S. PATENT DOCUMENTS

| | | | |
|---|---|---|---|
| 5,303,388 A | | 4/1994 | Kreitman et al. |
| 5,515,486 A | | 5/1996 | Amro et al. |
| 5,678,015 A | | 10/1997 | Gob |
| 5,724,492 A | | 3/1998 | Matthew, III et al. |
| 5,825,353 A | | 10/1998 | Will |
| 6,118,427 A | * | 9/2000 | Buxton et al. ............... 345/629 |
| 6,182,098 B1 | * | 1/2001 | Selker ........................ 715/202 |
| 6,480,188 B1 | | 11/2002 | Horsley |
| 2001/0048762 A1 | | 12/2001 | Matsuura et al. |
| 2002/0033849 A1 | | 3/2002 | Loppini et al. |
| 2003/0142136 A1 | * | 7/2003 | Carter et al. ............... 345/782 |

(Continued)

*Primary Examiner* — Kieu Vu
*Assistant Examiner* — Anita D Chaudhuri
(74) *Attorney, Agent, or Firm* — Kunzler Law Group

(57) ABSTRACT

For rotational graphical user interface navigation, a display module displays a first face of a uniform prism rotatable only about a central horizontal axis. The uniform prism includes a plurality of faces. Each face has Graphical User Interface (GUI) controls for a unique function set. Only one face of the uniform prism is visible at a time. Each face is displayed with a geometric shape conforming to a face geometry of the multidimensional solid when the multidimensional solid is being rotated, and a face is displayed as filling a screen when the multidimensional solid is not being rotated. An input module receives a rotational command. The rotational command rotates the uniform prism around the central horizontal axis. The rotation module rotates the uniform prism to display a second face in response to the rotational command, displaying the rotation of the uniform prism.

18 Claims, 7 Drawing Sheets

(56) References Cited

U.S. PATENT DOCUMENTS

| | | |
|---|---|---|
| 2006/0026535 A1 | 2/2006 | Hotelling et al. |
| 2006/0250377 A1* | 11/2006 | Zadesky et al. ............... 345/173 |
| 2006/0277454 A1 | 12/2006 | Chen |
| 2007/0011617 A1 | 1/2007 | Akagawa et al. |
| 2007/0124680 A1* | 5/2007 | Robbin et al. ................ 715/727 |
| 2007/0159464 A1 | 7/2007 | Seo et al. |
| 2007/0159497 A1 | 7/2007 | Gur et al. |
| 2008/0114587 A1 | 5/2008 | Scott |
| 2008/0231601 A1 | 9/2008 | Fyke et al. |
| 2008/0261660 A1 | 10/2008 | Huh et al. |

\* cited by examiner

ROTATIONAL GRAPHICAL USER INTERFACE NAVIGATION

CROSS-REFERENCE TO RELATED APPLICATIONS

This is a continuation application of and claims priority to U.S. patent application Ser. No. 12/054,293 entitled "APPRATUS, SYSTEM, AND METHOD FOR ROTATIONAL GRAPHICAL USER INTERFACE NAVIGATION" filed on Mar. 24, 2008 for Justin T. Dubbs et al., which is incorporated herein by reference.

BACKGROUND

1. Field

This invention relates to Graphical User Interface (GUI) navigation and more particularly relates to rotational GUI navigation.

2. Description of the Related Art

Electronic devices often employ GUIs to receive user commands. A GUI may represent one or more functions in a convenient, easily recognizable graphical form. For example, an audio GUI may include buttons for increasing and decreasing volume, selecting music tracks, adjusting balance, and the like.

A GUI may be organized with a hierarchy to aid the user in navigating to a desired function. For example, the GUI may be organized as a hierarchical menu with a main menu and sub menus. The user may select an overall functional area from the main menu. The GUI may then display sub menu options for specified functions. For example, a sub menu may allow the user to select entertainment functions such as audio functions, video functions, gaming functions, and the like.

Alternatively, the GUI may be organized with tabbed interfaces. Each tabbed interface may include a unique collection of functional controls. For example first tab may include audio functions and video functions while a second tab includes e-mail functions and voicemail functions. The user may select a tab to display related functions. The user may then choose a desired function from the displayed functions.

Unfortunately, many hierarchical GUIs and tabbed interfaces require a large screen in order to display navigation options and support the complexity of the GUI hierarchy. For example, displaying the hierarchy of a main menu and sub-menus may require a significant amount of screen space. As a result, such hierarchical GUIs may be inappropriate for smaller screens.

Users may also become confused with a menu hierarchy. For example, a user may forget which function is in which level of the hierarchy or not understand the logical behind the hierarchy. As a result, traditional GUIs may be difficult to navigate.

SUMMARY

An apparatus for rotational navigation is provided with a plurality of modules configured to functionally execute the steps of displaying a first face, receiving a rotational command, and rotating a three-dimensional solid. These modules in the described embodiments include a display module, and input module, and a rotational module.

The display module displays a first face of a uniform prism rotatable only about a central horizontal axis. The uniform prism includes a plurality of faces. Each face comprises Graphical User Interface (GUI) controls for a unique function set. Only one face of the uniform prism is visible at a time. Each face is displayed with a geometric shape conforming to a face geometry of the multidimensional solid when the multidimensional solid is being rotated, and a face is displayed as filling a screen when the multidimensional solid is not being rotated.

The input module receives a rotational command. The rotational command rotates the uniform prism around the central horizontal axis. The rotation module rotates the uniform prism to display a second face in response to the rotational command, displaying the rotation of the uniform prism. A computer program product and system that perform the functions of the apparatus are also described.

BRIEF DESCRIPTION OF THE DRAWINGS

In order that the advantages of embodiments of the invention will be readily understood, a more particular description of the embodiments briefly will be illustrated in the appended drawings. Understanding that these drawings depict only typical embodiments of the invention and are not therefore to be considered to be limiting of its scope, the embodiments will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
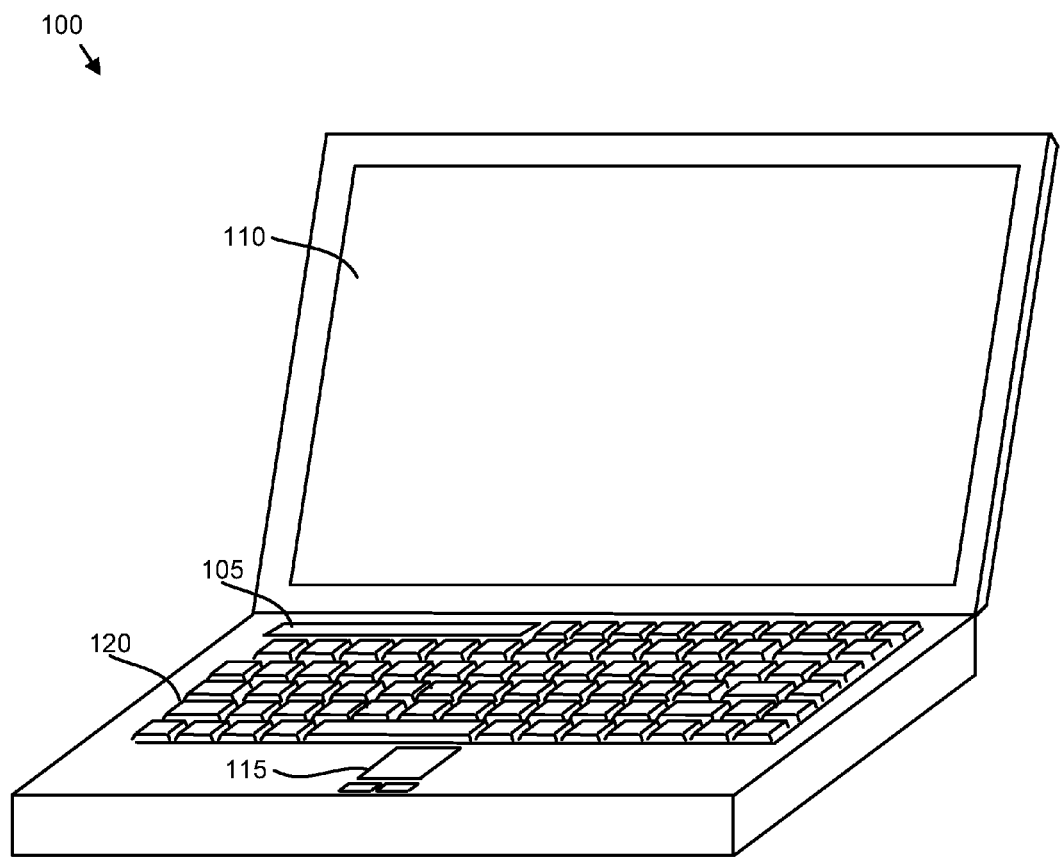
FIG. 1 is a perspective drawing illustrating one embodiment of a notebook computer.

FIG. 1 is a perspective drawing illustrating one embodiment of a notebook computer 100 in accordance with the present invention. The notebook computer 100 includes a display 110, a keyboard 120, cursor controls 115, and a touch screen 105. A user may view text and graphics on the display 110, enter data using the keyboard 120, and position a cursor on the display 110 using the cursor controls 115 as is well known to those of skill in the art. The cursor controls 115 may comprise one or more buttons and a touchpad.

The touch screen 105 may provide GUI controls for multiple function sets. For example, the touch screen 105 may provide audio controls, video controls, voice-recognition controls, communication controls, calendar functions, email functions, and the like. Thus the user may access a wide range of function controls using a relatively small portion of control surface real estate of the notebook computer 100.

The touch screen 105 may both display GUI controls and function as an input device. For example, the touch screen 105 may display a functional thumbwheel, track ball, or the like. The touch screen 105 may receive rotational commands. The rotational commands may be generated by the touch screen 105 in response to a finger being drawn along a surface vector of the touch screen 105.

Figure 2:
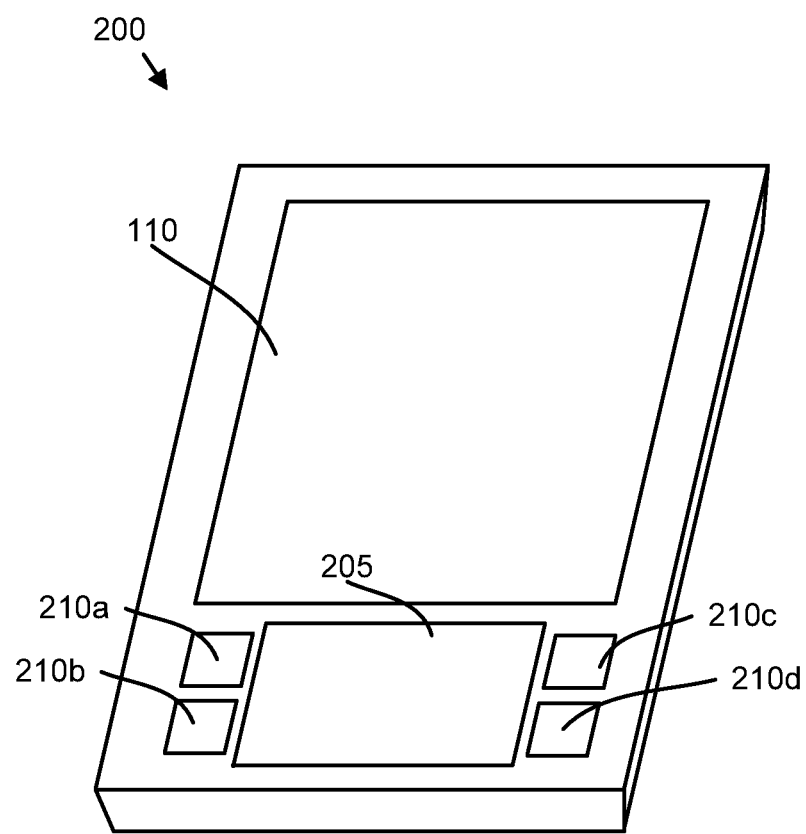
FIG. 2 is a perspective drawing illustrating one embodiment of a portable electronic device.

FIG. 2 is a perspective drawing illustrating one embodiment of a portable electronic device 200 of the present invention. The portable electronic device 200 includes a display 110, a control screen 205, and a plurality of controls 210. The user may view text and graphics in the display 110. The control screen 205 may be a touch screen. Alternatively, the control screen 205 may display function controls that the user may activate using the controls 210.

The controls 210 are shown as buttons. One of skill in the art will recognize that the present invention may also be practiced using controls 210 including but not limited to a mouse, a mechanical thumbwheel, a mechanical track ball, a pointing stick, a joy stick, and a touch pad. The present invention may employ the controls 210 to generate a rotational command.

Figure 3:
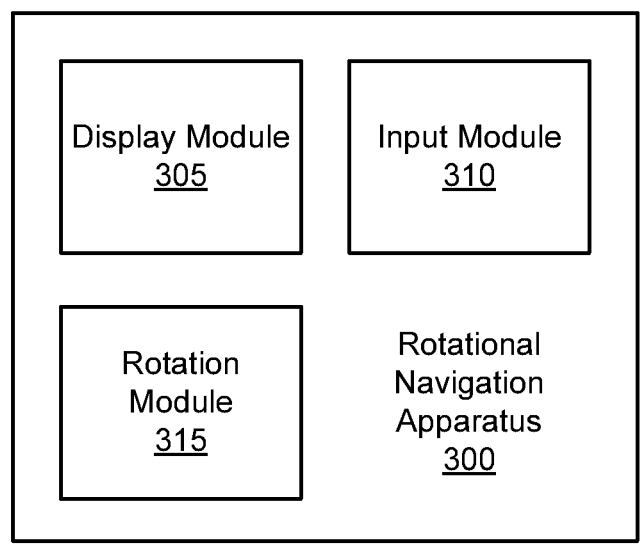
FIG. 3 is a schematic block diagram illustrating one embodiment of a rotational navigation apparatus.

FIG. 3 is a schematic block diagram illustrating one embodiment of a rotational navigation apparatus 300 of the present invention. The description of the apparatus 300 refers to elements of FIGS. 1 and 2, like numbers referring to like elements. The apparatus 300 allows the user to access a plurality of unique function sets through a screen such as the touch screen 105 of FIG. 1 or the control screen 205 of FIG. 2. Alternatively, the screen may be a display 110, an application window within a display 110, and/or a software frame as is well known to those of skill in the art.

The apparatus 300 includes a display module 305, an input module 310, and a rotation module 315. The display module 305, input module 310, and rotation module 315 may comprise computer program products that comprise a computer usable medium having a computer readable program stored on a tangible storage device. For example, the computer program products may comprise one or more software programs stored on a hard disk drive of the notebook computer 100 that are loaded into Random Access Memory (RAM) and executed by a processor as is well known to those of skill in the art.

The display module 305 displays a first face of a virtual multidimensional solid comprising a plurality of faces. Each face includes GUI controls for a unique function set. In one embodiment, the multidimensional solid is a three-dimensional solid. Alternatively, the multidimensional solid may be organized with more than three dimensions.

In a certain embodiment, the multidimensional solid is configured as a uniform prism. The uniform prism may be rotatable about a central axis. In one embodiment, the multidimensional solid includes a number of faces in the range of two (2) to twenty (20). The multidimensional solid may be rotatable about a number of axes. For example, a three-dimensional solid may be rotatable about three axes. In one embodiment, the multidimensional solid is rotatable about axes in the range of one (1) to five (5).

The input module 310 receives a rotational command. In one embodiment, the input module 310 includes a touch screen, such as the touch screen 105 of FIG. 1. The input module 310 may receive the rotational command from the touch screen 105. Alternatively, the input module 310 may include a control screen and controls such as the control screen 205 and controls 210 of FIG. 2. In one embodiment, the input module 310 includes a mouse, a mechanical thumbwheel, a mechanical track ball, a pointing stick, a joy stick, or a touch pad.

The rotational command is configured to rotate the multidimensional solid around a least one axis. For example, if the multidimensional solid is a uniform prism, the rotational command may rotate the uniform prism about a central axis. The multidimensional solid and the axes described herein are rendered and/or rotated about to appear to the user as though located three dimensionally within a screen.

The rotation module 315 rotates the multidimensional solid to display a second face in response to the rotational command. The rotation module 315 displays the rotation of the multidimensional solid as will be described hereafter. The apparatus 300 allows the user to navigate to one or more GUIs on the multidimensional solid using rotational commands.

In one embodiment, the rotation module 315 rotates the multidimensional solid to display the first face when data for the first face becomes relevant. For example, the first face may include GUI controls for an email function set. The rotation module 315 may rotate the multidimensional solid to the first face email function set when the notebook computer 100 receives an email.

The rotation module 315 may further to rotate the multidimensional solid to display the first face when the second face is unused for a specified time interval. The specified time interval may be in the range of 10 seconds to fifteen minutes (10 sec-15 min). For example, the first face may be a stock exchange feed. The rotation module 315 may rotate the multidimensional solid from a news feed second face to the stock exchange feed first face if the second face is unused for ten minutes (10 min).

Figure 4:
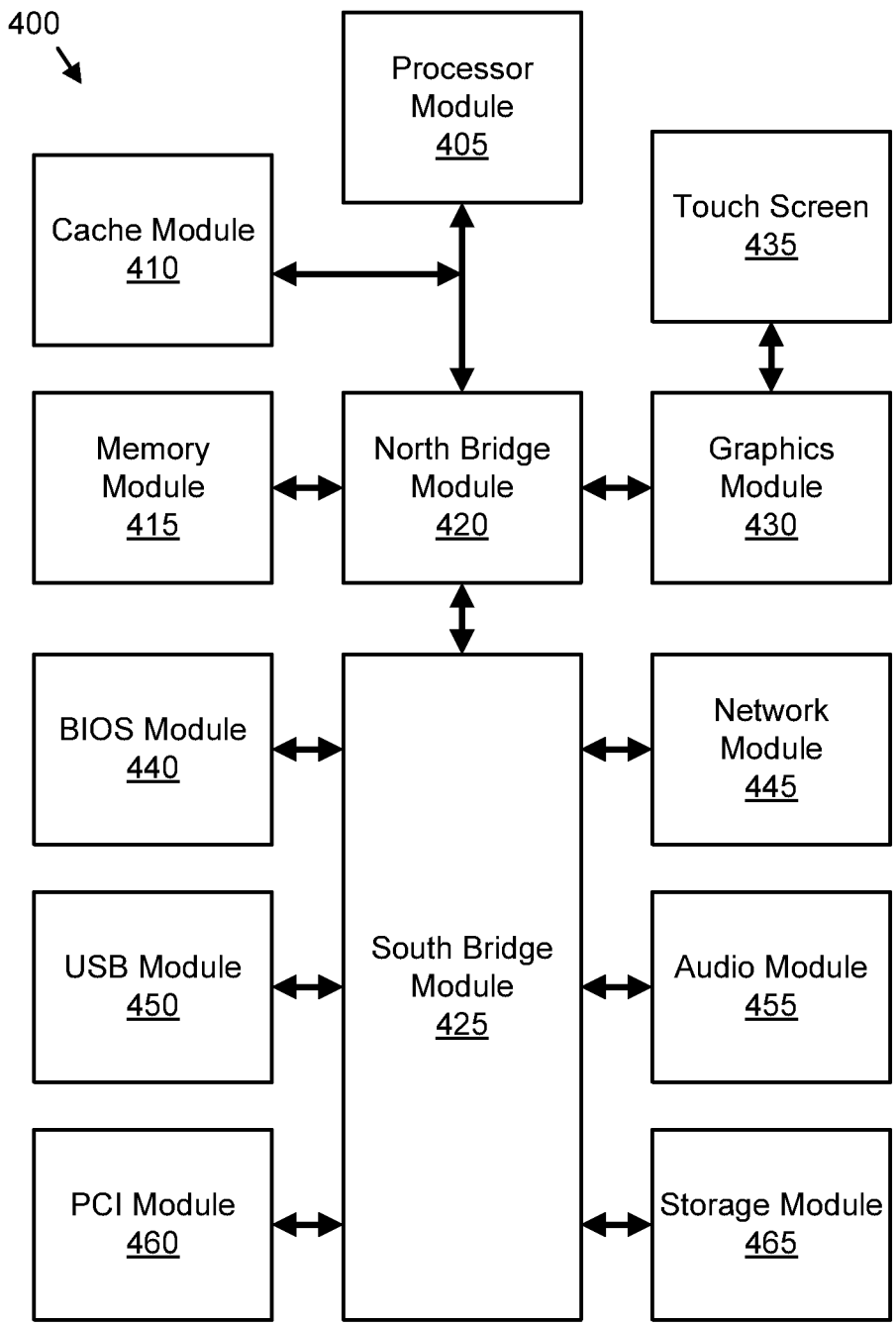
FIG. 4 is a schematic block diagram illustrating one embodiment of a computer.

FIG. 4 is a schematic block diagram illustrating one embodiment of a computer 400 of the present invention. The computer 400 may be embodied in the notebook computer 100 of FIG. 1 and/or the portable electronic device 200 of FIG. 2. The computer 400 includes a processor module 405, a cache module 410, a memory module 415, a north bridge module 420, a south bridge module 425, a graphics module 440, a display module 445, a basic input/output system ("BIOS") module 440, a network module 445, a peripheral component interconnect ("PCI") module 460, and a storage module 465.

The processor module 405, cache module 410, memory module 415, north bridge module 420, south bridge module 425, graphics module 440, display module 445, BIOS module 440, network module 445, PCI module 460, and storage module 465, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory module 415 stores software instructions and data and may include RAM. The processor module 405 executes the software instructions and manipulates the data as is well known to those skilled in the art. The software instructions and data may be configured as one or more computer readable programs. The computer readable programs may be tangibly stored in the storage module 465. The storage module 465 may be a hard disk drive, an optical storage device, a holographic storage device, a micromechanical storage device, a semiconductor storage device, or the like.

The processor module 405 may communicate with the cache module 410 through a processor interface bus to reduce the average time to access memory module 415. The cache module 410 may store copies of the data from the most frequently used memory module 415 locations. The computer 400 may use one or more cache modules 410 such as a DDR2 cache memory or the like.

The north bridge module 420 may communicate with and provide bridging functionality between the processor module 405, the graphic module 440, the memory module 415, and the cache module 410. The processor module 405 may be connected to the north bridge module 420 over a, for example, six hundred sixty seven Megahertz (667 MHz) front side bus.

The north bridge module 420 may be connected to the south bridge module 425 through a direct media interface (DMI) bus. The DMI bus may provide a high-speed, bi-directional, point-to-point link supporting a clock rate for example of one Gigabytes per second (1 GBps) in each direction between the north bridge module 420 and the south bridge module 425. The south bridge module 425 may support and communicate with the BIOS module 440, the network module 445, the PCI module 460, and the storage module 465.

The PCI module 460 may communicate with the south bridge module 425 for transferring data or power to peripheral devices. The PCI module 460 may include a PCI bus for attaching the peripheral devices. The PCI module 460 may further comprise one or more input devices such as the touch screen 105 of FIG. 1, the controls 210 of FIG. 2, a mouse, a mechanical thumbwheel, a mechanical track ball, a pointing stick, a joy stick, and/or touch pad.

The BIOS module 440 may communicate instructions through the south bridge module 425 to boot the computer 400, so that software instructions stored on the storage module 465 can load, execute, and assume control of the computer 400. Alternatively, the BIOS module 440 may comprise a coded program embedded on a chipset that recognizes and controls various devices that make up the computer 400.

The network module 445 may communicate with the south bridge module 425 to allow the computer 400 to communicate with other devices over a network. The devices may include routers, bridges, computers, printers, and the like.

The display module 445 may communicate with the graphic module 440 to display the multidimensional solid and GUI functions as will be described hereafter. The display module 445 may include the displays 110 of FIGS. 1 and 2, the touch screen 105 of FIG. 1, and/or the control screen 205 of FIG. 2.

Figure 5:
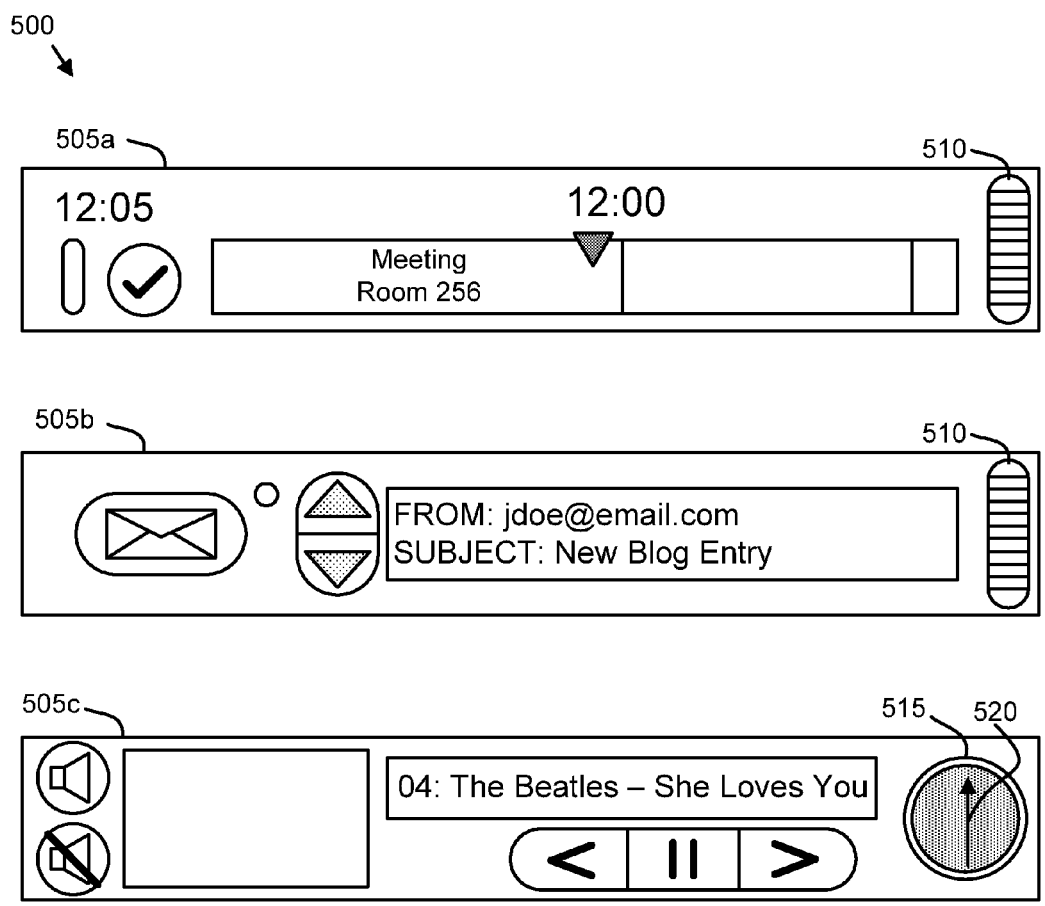
FIG. 5 is a front view drawing illustrating one embodiment of multidimensional solid faces.

FIG. 5 is a front view drawing illustrating one embodiment of multidimensional solid faces 500 of the present invention. A plurality of faces 505 are shown each with GUI controls for unique function set. A first face 505a is illustrative of GUI controls for a calendar function set. A second face 505b is illustrative of GUI controls for an e-mail function set. A third face 505c is illustrative of GUI controls for an audio function set. One of skill in the art will recognize that the present invention may be practiced with faces 505 comprising a wide variety of functions sets including but not limited to calendar, e-mail, voicemail, music player, system status information, preview of open application windows, selection of open application windows, Really Simple Syndication (RSS) feed information, and gaming function sets. The user may activate the GUI controls by touching an area of a control as is well known to those of skill in the art.

In the depicted embodiment, each face 505 is displayed on a touch screen. The first and second faces 505a, 505b further include a thumbwheel GUI 510 represented on the touch screen. The user may slide a finger over the thumbwheel GUI 510 to issue rotational commands. For example, the user may slide a finger vertically over the thumbwheel GUI 510 from top to bottom to issue a rotational command to rotate the multidimensional solid about a virtual axis parallel to a virtual axis of the thumbwheel GUI 510, with a virtual front of the multidimensional solid rotating downward.

Similarly, the user may slide a finger over the thumbwheel GUI 510 vertically from bottom to top to issue rotational command to rotate the multidimensional solid about the virtual axis, with the front of the multidimensional solid rotating upward. In one embodiment, the user may slide a finger horizontally over the thumbwheel 510 to select a different axis of the multidimensional solid. For example, the user may slide a finger horizontally over the thumbwheel GUI 510 from left to right to move from navigating about a first axis of the multidimensional solid to navigating about a second axis of the multidimensional solid.

In one embodiment, the user may issue a rotational command to transition to other functions groups. For example, the user may issue a rotational command such as sliding a finger across the thumbwheel GUI 510 to change functional groups from a connection control functional group to a backup management functional group.

The third face 505c includes a trackball GUI 515 represented on the touch screen. The user may issue a rotational command by sliding a finger over the trackball GUI 515. The user may rotate the multidimensional solid about a plurality of axes depending on the angle of a surface vector 520 of the finger moving across the trackball GUI 515. For example, the user may slide a finger over the trackball GUI 515 vertically from bottom to top to issue rotational command to rotate the multidimensional solid about the virtual axis, with the front of the multidimensional solid rotating upward as shown by the surface vector 520. Similarly, the user may slide a finger over the trackball GUI 515 horizontally from left to right to issue a rotational command to rotate the multidimensional solid about a virtual axis parallel to a vertical axis of the third face 505c.

The faces 505 may be displayed on a screen such as the touch screen 105 FIG. 1. In one embodiment, the screen has a horizontal dimension in the range of one to twenty centimeters (1-20 cm). In addition, the screen may have a vertical dimension in the range of one to ten centimeters (1-10 cm).

In one embodiment, the display module 305 may assign functions to a face 505 in response to user command. For example, the user may employ a GUI of the display module 305 to assign video GUI controls to a specified face 505.

In one embodiment, faces 505 with related function sets are grouped along an axis. For example, entertainment related function sets may be grouped as a functional group along a first axis while communication related function sets may be grouped as a functional group along a second axis. The user may issue a rotational command to rotate the multidimensional solid to switch between axes. For example, the rotational commands issued through the thumbwheel 510 may rotate the multidimensional solid between a plurality of entertainment functional group of faces 505 organized around an entertainment axis. The user may further slide a finger horizontally across the thumbwheel 510 to issue a rotational command that rotates the multidimensional solid from rotating about the entertainment axis to rotating about a communication axis. Alternatively, a rotational command issued through the trackball 515 may rotate the multidimensional solid between the entertainment axis and the communication axis.

Functional groups may further be organized in parallel groups. For example, the functions groups may include an entertainment functional group, a power management functional group, and a sports feed functional group. The user may transition between the parallel functional groups.

By organizing each functional group of faces 505 around an axis or as parallel functional groups, the user may recognize a functional group without the need for a label to identify the group. For example, a face 505 with audio GUI controls may be readily identified as an element of entertainment functional group. The user may recognize that by issuing rotational commands to transition to the entertainment functional group, the user may navigate to other faces with entertainment related GUI controls in the entertainment functional group.

In one embodiment, each face 505 may be organized in a plurality of functional groups on each on one of a plurality of axes. For example, the face 505c with audio GUI controls may be organized on an entertainment axis, an audio axis, and a leisure axis. The leisure axis may include a plurality of faces 505 with game GUI controls, shopping GUI controls, GUI controls for purchasing sports tickets, and the like. The entertainment access may include a plurality of faces 505 with video GUI controls, Web browsing GUI controls, blog GUI controls, and the like. The audio axis may include a plurality of faces 505 with volume GUI controls, podcast GUI controls, audio recording GUI controls, and the like.

Figure 6:
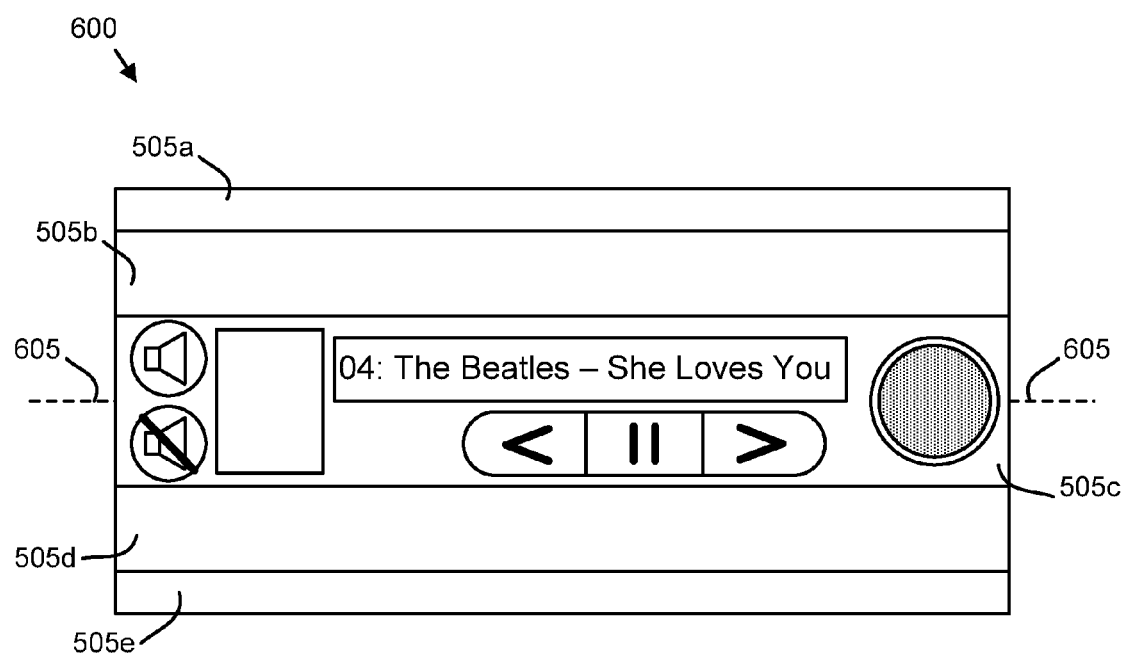
FIG. 6 is a front view drawing illustrating one embodiment of a multidimensional solid.

FIG. 6 is a front view drawing illustrating one embodiment of a multidimensional solid 600 of the present invention. The description of the multidimensional solid 600 refers to elements of FIGS. 1-5, like numbers referring to like elements. The multidimensional solid 600 is shown configured as a uniform prism with a plurality of faces 505. However one of skill in the art will recognize that the invention may be practiced using any configuration of multidimensional solid 600.

A plurality of faces 505 are displayed around the multidimensional solid 600. The third face 505c of FIG. 5 is shown with audio GUI controls displayed. Additional faces are not shown but are obscured by the forward faces 505a-e.

The multidimensional solid 600 is rotatable about a central axis 605. The user may issue a rotational command to virtually rotate the multidimensional solid 600 about the central axis 605. For example, the user may slide a finger over the thumbwheel GUI 510 from top to bottom to rotate the third face 505c of the multidimensional solid 600 from top to bottom about the central axis 605.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
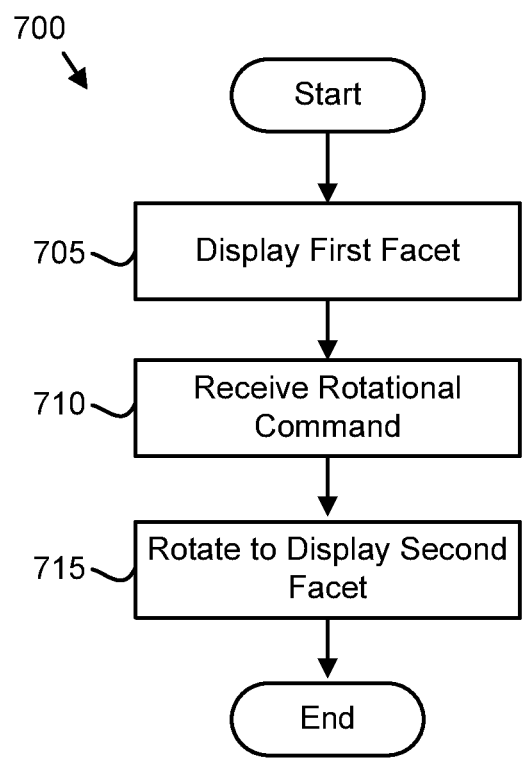
FIG. 7 is a schematic flow chart diagram illustrating one embodiment of a rotational navigation method.

FIG. 7 is a schematic flow chart diagram illustrating one embodiment of a rotational navigation method 700 of the present invention. The method 700 substantially includes the steps to carry out the functions presented above with respect to the operation of the described apparatus and system of FIGS. 1-6. In one embodiment, the method 700 is implemented with a computer program product comprising a computer readable storage medium having a computer readable program. The computer readable program may be executed by a computer such as the computer 400 of FIG. 4.

The method 700 begins and the display module 305 displays 705 a first face 505a of a virtual multidimensional solid 600 comprising a plurality of faces 505. Each face 505 comprises GUI controls for a unique function set.

In one embodiment, the multidimensional solid 600 is organized as a sphere. The sphere may include a plurality of longitudinal axes. Each of the longitudinal axes may be configured as a functional group. The faces 505 of each functional group may be organized latitudinally around the sphere. A first longitudinal axis may for example include five faces 505 organized latitudinally around the sphere. A second longitudinal axis may include 10 faces 505 organized latitudinally around the sphere. Thus there may be breaks between faces. Alternatively, a face in the first axis may not always be logically adjacent to a face in the second axis.

The input module 310 receives a rotational command that rotates the multidimensional solid 600 around at least one axis. In one embodiment, the rotational command may be a left horizontal rotational command, a right horizontal rotational command, and up vertical rotational command, and a down vertical rotational command.

The left horizontal rotational command may rotate the virtual front of the multidimensional solid 600 from left to right about a virtual vertical axis. The right horizontal rotational command may rotate the virtual front of the multidimensional solid 600 from right to left about the virtual vertical axis. The up vertical rotational command may rotate the virtual front of the multidimensional solid 600 from bottom to top about a virtual horizontal axis. Similarly the down vertical rotational command may rotate the virtual front of the multidimensional solid 600 from top to bottom about the virtual horizontal axis.

In one embodiment, the rotational command transitions between parallel or related groups of faces. For example, the rotational command may transition from a news source functional group to a parallel sports functional group.

In one embodiment, the rotational command may further be one of a left up diagonal rotational command, a right up diagonal rotational command, a left down diagonal rotational command, and a right down diagonal rotational command. The left up diagonal rotational command, right up diagonal rotational command, left down diagonal rotational command, and right down diagonal rotational command may each rotate the multidimensional solid around two axes.

The rotation module 315 rotates 715 the multidimensional solid 600 to display a second face 505b in response to the rotational command. The rotation module 315 displays the rotation of the multidimensional solid 600 while rotating multidimensional solid. In one embodiment, the rotation module 315 displays each face 505 of the multidimensional solid 600 as conforming to a face geometry of the multidimensional solid 600 when the multidimensional solid 600 is being rotated. For example, if the multidimensional solid 600 is configured as a dodecahedron, each face 505 of the multidimensional solid 600 may be rendered as a pentagon while displaying the rotation of the multidimensional solid 600. In addition, each face 505 of the dodecahedron may be displayed as filling the screen when the multidimensional solid 600 is not being rotated. For example, a pentagonal face 505 of the dodecahedron may be displayed as a rectangle within a rectangular screen.

In one embodiment, the rotation module 315 tracks a beginning face 505 and an ending face 505 for each navigation of the multidimensional solid 600. The rotation module 315 may organize the geometry of the multidimensional solid 600 to minimize a number of face rotations required to navigate between faces 505 that are often viewed sequentially. For example, if a user regularly navigates from an audio GUI control face 505c to a market report GUI control face, the rotation module 315 may organize the multidimensional solid 600 so that a minimum rotation of the multidimensional solid 600 is required to navigate between the faces.

By organizing GUI controls on the multidimensional solid 600, the GUI controls may be intuitively organized. In addition, the user may rapidly navigate between GUI control faces 505. The present invention also reduces the need for navigational labels, tabs, and the like. Thus a plurality of GUI controls may be effectively organized and displayed within a small screen.

The present invention organizes GUI function sets as faces 505 of a multidimensional solid 600. In addition, the present invention allows the rotational navigation of the GUI function sets. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory computer readable storage medium having a computer readable program stored on a tangible storage device, wherein the computer readable program when executed on a computer causes the computer to:

display a second face of a multidimensional solid and comprising a plurality of faces wherein each face comprises Graphical User Interface (GUI) controls for a unique function set with GUI controls for other faces not visible through each face, each face is displayed with a geometric shape conforming to a face geometry of the multidimensional solid when the multidimensional solid is being rotated automatically rotate the multidimensional solid from the second face to display a first face in response to data for the first face becoming relevant, displaying the rotation of the multidimensional solid; and automatically rotate the multidimensional solid to display the first face when the second face is unused for a specified time interval.

2. The computer program product of claim 1, wherein the computer readable program further causes the computer to receive a rotational command from a touch screen and rotate the multidimensional solid in response to the rotational command.

3. The computer program product of claim 2, wherein the computer readable program further causes the computer to receive the rotational command from a thumbwheel GUI represented on the touch screen.

4. The computer program product of claim 2, wherein the computer readable program further causes the computer to receive the rotational command from a track ball GUI represented on the touch screen.

5. The computer program product of claim 2, wherein the rotational command is generated in response to at least one finger being drawn along a surface vector of the touch screen.

6. The computer program product of claim 2, wherein an input device selected from a mouse, a mechanical thumbwheel, a mechanical track ball, a pointing stick, a joy stick, and a touch pad generates the rotational command.

7. The computer program of claim 1, wherein the multidimensional solid comprises a number of faces in the range of the two to twenty.

8. The computer program of claim 1, wherein the multidimensional solid is rotatable about a number of axes in the range of one to five.

9. The computer program product of claim 1, wherein each face is displayed on a screen with a horizontal dimension in the range of one to twenty centimeters.

10. The computer program product of claim 1, wherein each face is displayed on a screen with a vertical dimension in the range of one to ten centimeters.

11. The computer program product of claim 1, wherein the computer readable program is further configured to cause the computer to assign functions to a face in response to a user command.

12. The computer program product of claim 1, wherein the computer readable program further causes the computer to shift from a first functional set group to a second functional set group in response to a user command.

13. An apparatus comprising:

a non-transitory computer readable storage medium that stores computer readable programs executable by a processor, the computer readable programs comprising:

a display module that displays a second face of a multidimensional solid comprising a plurality of faces wherein each face comprises Graphical User Interface (GUI) controls for a unique function set with GUI controls for other faces not visible through each face, each face is displayed with a geometric shape conforming to a face geometry of the multidimensional solid when the multidimensional solid is being rotated; and a rotation module automatically that rotates the multidimensional solid to display from the second face to display a first face in response to data for the first face becoming relevant, displaying the rotation of the multidimensional solid and automatically rotates the multidimensional solid to display the first face when the second face is unused for a specified time interval and automatically.

14. The apparatus of claim 13, the computer readable programs further comprising an input module that receives a rotational command and the rotation module rotates the multidimensional solid to display the first face in response to the rotational command, wherein the rotational command is received from a thumbwheel GUI represented on a touch screen.

15. The apparatus of claim 13, the computer readable programs further comprising an input module that receives a rotational command and the rotation module rotates the multidimensional solid to display the first face in response to the rotational command, wherein the rotational command is received from a track ball GUI represented on a touch screen.

16. The apparatus of claim 13, the computer readable programs further comprising an input module that receives a rotational command and the rotation module rotates the multidimensional solid to display the first face in response to the rotational command, wherein the rotational command is generated in response to at least one finger being drawn along a surface vector of a touch screen.

17. A system comprising:
a touch screen;
a memory module that stores instructions and data;
a processor module in communication with the touch screen and the memory module, that executes the instructions and data, and comprising
a display module that displays a second face of a multidimensional solid and comprising a plurality of faces wherein each face comprises Graphical User Interface (GUI) controls for a unique function set with GUI controls for other faces not visible through each face, each face is displayed with a geometric shape conforming to a face geometry of the multidimensional solid when the multidimensional solid is being rotated; and
a rotation module that automatically rotates the multidimensional solid from the second face to display a first face in response to data for the first face becoming relevant, displaying the rotation of the multidimensional solid and automatically rotates the multidimensional solid to display the first face when the second face is unused for a specified time interval.

18. The system of claim 17, the processor module further comprising an input module that receives a rotational command and the rotation module rotates the multidimensional solid to display the first face in response to the rotational command, wherein the rotational command is received from a thumbwheel GUI represented on a touch screen.

* * * * *